US009336442B2

(12) United States Patent
Cok (10) Patent No.: US 9,336,442 B2
(45) Date of Patent: May 10, 2016

(54) SELECTING IMAGES USING RELATIONSHIP WEIGHTS

(75) Inventor: Ronald Steven Cok, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 839 days.

(21) Appl. No.: 13/352,387

(22) Filed: Jan. 18, 2012

(65) Prior Publication Data

US 2013/0182963 A1 Jul. 18, 2013

(51) Int. Cl.
*G06K 9/00* (2006.01)

(52) U.S. Cl.
CPC ................... *G06K 9/00677* (2013.01)

(58) Field of Classification Search
CPC ................................. G06K 9/00677
USPC ......................... 382/100, 224, 305
See application file for complete search history.

(56) References Cited

U.S. PATENT DOCUMENTS

| | | | |
|---|---|---|---|
| 6,282,317 B1 | 8/2001 | Luo et al. | |
| 6,526,158 B1* | 2/2003 | Goldberg | 382/115 |
| 6,671,405 B1 | 12/2003 | Savakis et al. | |
| 6,816,847 B1 | 11/2004 | Toyama | |
| 7,035,467 B2 | 4/2006 | Nicponski | |
| 7,929,733 B1* | 4/2011 | Lehnert et al. | 382/116 |
| 8,352,465 B1* | 1/2013 | Jing et al. | 707/723 |
| 2003/0149744 A1* | 8/2003 | Bierre et al. | 709/217 |
| 2004/0075743 A1 | 4/2004 | Chatani | |
| 2004/0156535 A1* | 8/2004 | Goldberg et al. | 382/115 |
| 2007/0177805 A1 | 8/2007 | Gallagher | |
| 2011/0075917 A1 | 3/2011 | Cerosaletti et al. | |
| 2011/0123124 A1 | 5/2011 | Peters | |
| 2011/0142300 A1* | 6/2011 | Zhang et al. | 382/118 |

FOREIGN PATENT DOCUMENTS

WO WO-2008/156558 12/2008

OTHER PUBLICATIONS

Viola et al, Rapid object detection using a boosted cascade of simple features, Proc. of 2001 IEEE Computer Society Conf. 2001, pp. I-511-1-518.
Schneiderman, Feature-concentric evaluation for efficient cascaded object detection, Comp. Vision and Pattern Recognition, Proc. of 2004 IEEE Computer Society Conf. 2004, pp. II-29-II-36, vol. 2.
Cootes et al, Active shape models—their training and application, Computer Vision and Image Understanding, vol. 61, pp. 38-59, 1995.
Ptucha et al, Facial Pose Estimation Using a Symmetrical Feature Model, Proc. of ICME—Workshop on Media Information Analysis for Personal and Social Applications, 2009.

* cited by examiner

*Primary Examiner* — Ishrat I Sherali (57) ABSTRACT

A method of making a selected-image collection including providing a set of relationships between an individual and a plurality of different persons, each relationship in the relationship set having a pre-determined relationship weight value; providing a collection of images, the image collection including images having at least two persons of the plurality of different persons present in the images; using a processor to select from the relationship set a relationship weight value corresponding to each person present in each image in the image collection; assigning an image weight value to each image in the image collection, the image weight value corresponding to a combination of the selected relationship weight value(s); and selecting images from the image collection based on the image weight values to make the selected-image collection.

23 Claims, 7 Drawing Sheets

| Individual | Person A Relationship | Person B Relationship | Person C Relationship | Person D Relationship | Person E Relationship |
|---|---|---|---|---|---|
| Individual X | 80% | 50% | 20% | 0 | 0 |
| Individual Y | 50% | 0 | 0 | 75% | 0 |
| Individual A | 100% | 50% | 0 | 55% | 50% |

FIG. 2

| Image | Person A Present | Person B Present | Person C Present | Person D Present | Person E Present |
|---|---|---|---|---|---|
| Image 1 | Yes | Yes | Yes | Yes | Yes |
| Image 2 | No | No | Yes | No | No |
| Image 3 | Yes | No | No | Yes | Yes |
| Image 4 | Yes | Yes | No | No | Yes |

FIG. 3

| Individual X | Person A Relationship | Person B Relationship | Person C Relationship | Image Value Relationship |
|---|---|---|---|---|
| Image 1 | 80% | 50% | 20% | 1.5 |
| Image 2 | - | - | 20% | 0.2 |
| Image 3 | 80% | - | - | 0.8 |
| Image 4 | 80% | 50% | - | 1.3 |

FIG. 4

| Individual X | Person A Relationship | Person B Relationship | Person C Relationship | Person D Relationship | Person E Relationship | Image Value |
|---|---|---|---|---|---|---|
| Image 1 | 80% | 50% | 20% | 44% | 40% | 2.34 |
| Image 2 | - | - | 20% | - | - | 0.2 |
| Image 3 | 80% | - | - | 44% | 40% | 1.64 |
| Image 4 | 80% | 50% | - | - | 40% | 1.70 |

FIG. 5

| Individual Y | Person A Relationship | Person D Relationship | Image Value Relationship |
|---|---|---|---|
| Image 1 | 50% | 75% | 1.25 |
| Image 2 | - | - | 0.0 |
| Image 3 | 50% | 75% | 1.25 |
| Image 4 | 50% | - | 0.5 |

FIG. 6

| Individual Y | Person A Relationship | Person B Relationship | Person D Relationship | Image Value Relationship |
|---|---|---|---|---|
| Image 1 | 50% | 25% | 75% | 1.50 |
| Image 2 | - | - | - | 0.0 |
| Image 3 | 50% | - | 75% | 1.25 |
| Image 4 | 50% | 25% | - | 0.75 |

| Individual A | Person A Relationship | Person B Relationship | Person D Relationship | Person E Relationship | Image Value |
|---|---|---|---|---|---|
| Image 1 | 100% | 50% | 55% | 50% | 2.55 |
| Image 2 | - | - | - | - | 0.0 |
| Image 3 | 100% | - | 55% | 50% | 2.05 |
| Image 4 | 100% | 50% | - | 50% | 2.0 |

FIG. 11

| Individual A | Person A Relationship | Person B Relationship | Person C Relationship | Person D Relationship | Person E Relationship | Image Value |
|---|---|---|---|---|---|---|
| Image 1 | 100% | 50% | 16% | 55% | 50% | 2.71 |
| Image 2 | - | - | 16% | - | - | 0.16 |
| Image 3 | 100% | - | - | 55% | 50% | 2.05 |
| Image 4 | 100% | 50% | - | - | 50% | 2.0 |

FIG. 12

| Individual X & Y | Person A Relationship | Person B Relationship | Person C Relationship | Person D Relationship | Person E Relationship | Image Value |
|---|---|---|---|---|---|---|
| Image 1 | 80%+50% | 50%+25% | 20% | 44%+75% | 40% | 3.84 |
| Image 2 | - | - | 20% | - | - | 0.2 |
| Image 3 | 80%+50% | - | - | 44%+75% | 40% | 2.89 |
| Image 4 | 80%+50% | 50%+25% | - | - | 40% | 2.45 |

FIG. 13

|  | Person A Prominence | Person B Prominence | Person C Prominence |
|---|---|---|---|
| Image 1 | 60% | 30% | 30% |
| Image 2 | - | - | 80% |
| Image 3 | 20% | - | - |
| Image 4 | 40% | 40% | - |

FIG. 15

| Individual X | Person A Relationship | Person B Relationship | Person C Relationship | Image Value |
|---|---|---|---|---|
| Image 1 | 80%*0.6 | 50%*0.3 | 20%*0.3 | 0.69 |
| Image 2 | - | - | 20%*0.8 | 0.16 |
| Image 3 | 80%*0.2 | - | - | 0.16 |
| Image 4 | 80%*0.4 | 50%*0.4 | - | 0.52 |

FIG. 16

| Self | 100% |
|---|---|
| Spouse | 100% |
| Child | 80% |
| Sibling | 70% |
| Parent | 75% |
| Close Friend | 50% |
| Friend | 20% |
| Identified Individual | X% |

FIG. 17

SELECTING IMAGES USING RELATIONSHIP WEIGHTS

FIELD OF THE INVENTION

The present invention relates to a method for selecting images from an image collection by using pre-determined relationships between people depicted in the images.

BACKGROUND OF THE INVENTION

Products that include images are a popular keepsake or gift for many people. Such products typically include an image captured by a digital camera that is inserted into the product and is intended to enhance the product, the presentation of the image, or to provide storage for the image. Examples of such products include picture albums, photo-collages, posters, picture calendars, picture mugs, t-shirts and other textile products, picture ornaments, picture mouse pads, and picture post cards. Products such as picture albums, photo-collages, and picture calendars include multiple images.

When designing or specifying photographic products, it is desirable to select a variety of images that provide interest, aesthetic appeal, and emotional value. For example, a selection of images having subjects that are known and important to a customer makes a photographic product more valuable and appealing to the customer.

In conventional practice, images for a photographic product are selected by a product designer or customer, either manually or with the help of tools. For example, graphic and imaging software tools are available to assist a user in laying out a multi-image product, such as a photo-book, with a computer. Similarly, on-line tools available over the internet from a remote computer server enable users to specify photographic products. The Kodak Gallery provides such image-product tools. However, in many cases consumers have a large number of images, for example stored in an electronic album in a computer-controlled electronic storage device using desktop or on-line imaging software tools. The selection of an appropriate variety of images from the large number of images available can be tedious and time consuming.

A variety of methods are known in the prior art for automating the selection of images from an image collection, for example as described in U.S. Patent Application Publication 2011/0123124. It is known to select images based on an image quality criterion, to select images shared in a social network that are the most commented upon or that have a relatively large number of approvals, and to recognize individuals depicted in a photograph. Semantic understanding of an image can be used to automatically create an image product, as described in WO 2008/156558 and U.S. Pat. No. 7,035,467.

U.S. Patent Application Publication 2007/0177805 describes a method of searching through a collection of images, includes providing a list of individuals of interest and features associated with such individuals; detecting people in the image collection; determining the likelihood for each listed individual of appearing in each image collection in response to the people detected and the features associated with the listed individuals; and selecting in response to the determined likelihoods a number of images such that each individual from the list appears in the selected images.

U.S. Pat. No. 6,671,405 discloses an approach which computes a metric of "emphasis and appeal" of an image, without user intervention. A first metric is based upon a number of factors, which can include: image semantic content (e.g. people, faces); objective features (e.g., colorfulness and sharpness); and main subject features (e.g., size of the main subject). A second metric compares the factors relative to other images in a collection. The factors are integrated using a trained reasoning engine. The method described in U.S. Patent Application Publication 2004/0075743 by Chantani et al., is somewhat similar and discloses the sorting of images based upon user-selected parameters of semantic content or objective features in the images. U.S. Pat. No. 6,816,847 to Toyama, discloses an approach to compute the aesthetic quality of images through the use of a trained and automated classifier based on features of the image. Recommendations to improve the aesthetic score based on the same features selected by the classifier can be generated with this method. U.S. Patent Publication 2011/0075917 describes estimating aesthetic quality of digital images.

These various methods assist in automating the selection of images in a collection based on a variety of criteria but do not include automatically selecting images based on their emotional appeal and value to a specific individual. There is a need therefore, for a method that reduces the effort required by a customer to select images from a collection for a multi-image product and that provides a multi-image product with emotional meaning and value to the customer.

SUMMARY OF THE INVENTION

In accordance with the present invention there is provided a method of making a selected-image collection, comprising:

(a) providing a set of relationships between an individual and a plurality of different persons, each relationship in the relationship set having a pre-determined relationship weight value;

(b) providing a collection of images, the image collection including images having at least two persons of the plurality of different persons present in the images;

(c) using a processor to select from the relationship set a relationship weight value corresponding to each person present in each image in the image collection;

(d) assigning an image weight value to each image in the image collection, the image weight value corresponding to a combination of the selected relationship weight value(s); and (e) selecting images from the image collection based on the image weight values to make the selected-image collection.

It is an advantage of the present invention that an effective method is provided to select images from an image collection for an image-based product that provide emotional meaning and value.

DETAILED DESCRIPTION OF THE INVENTION

The present invention describes a method for automatically selecting images from an image collection to make a selected-image collection. The selected images can be used to make a photographic product, for example a multi-image product such as a photo album, calendar, or photo-collage. The photographic product can be a hardcopy product, for example printed on photographic paper or an electronic product, for example viewed on a computer monitor or display. Electronic products can be stored in a memory associated with a processor. Software programs that execute on the processor can display an electronic product on a computer-controlled monitor, television, or display. Electronic multi-image products can include, for example, photo-books, photo-collages, calendars, and slide shows.

Figure 1:
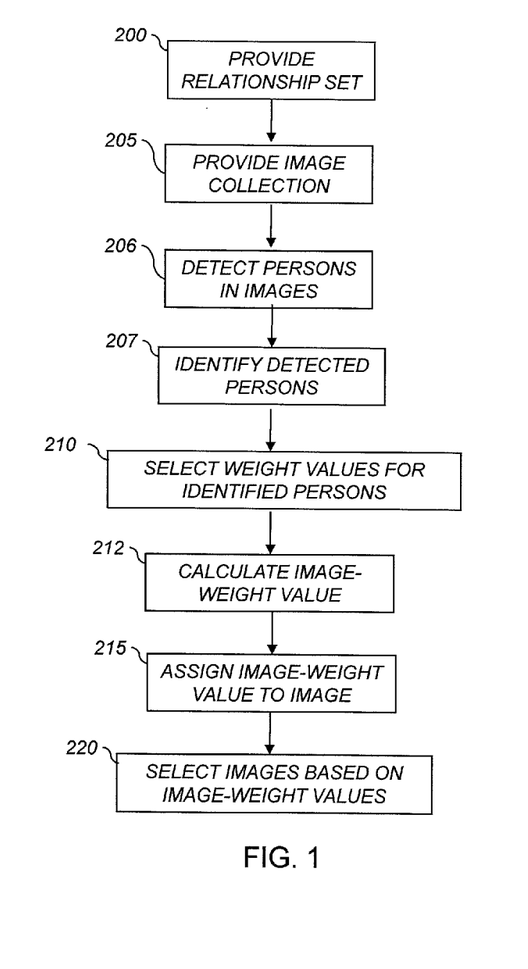
FIG. 1 is a flow diagram according to an embodiment of the present invention.

According to one embodiment of the present invention and as illustrated in FIG. 1, a method of making a selected-image collection includes providing a set of relationships between an individual and a plurality of different persons in step 200. Each relationship in the relationship set has a pre-determined relationship weight value. In step 205, a collection of images is provided, the image collection including images having at least two persons of the plurality of different persons present in the images. In step 210, a processor is used to select from the relationship set a relationship weight value corresponding to each person present in each image in the image collection. An image weight value corresponding to a combination of the selected relationship weight values is calculated in step 212 for each image and individual. The calculated image weight value is assigned to each corresponding image in the image collection, in step 215. Images from the image collection are selected in step 220 based on the image weight values to make a selected image collection.

In a further embodiment of the present invention, a processor can be used to facilitate the weight value selection by automatically detecting persons (step 206) in the images and then identifying the detected persons (step 207). The identified persons can be matched to persons found in the relationship set and the relationship weight value associated with the detected; identified, and matched persons selected by retrieving the values from a memory store (step 210).

An embodiment of the present invention as illustrated in the example of FIG. 1 can be implemented with a programmable computing device, for example including an electronic processor and an electronic memory for storing executable software programs, for storing a database including person identification information and associated relationship weight values, and for storing digital images. The processor and memory can be a single device or include multiple devices and can be located in a single, common location or dispersed over multiple locations. The elements of the programmable computing device can be connected through network connections and can communicate with other electronic devices through such network connections, for example through an Ethernet network or the internet. Such programmable computing devices are known in the art and are discussed in greater detail below. Algorithms and software for performing database operations, digital image access and storage, person detection and identification in digital images, and the association of values with data elements are all known in the computing art.

The present invention can be used to express a degree of emotional closeness in a relationship, to calculate the degree of emotional closeness expressed in an image, and to select images based on the calculation. Relationship weight values can also express degrees of various other types of relationships, such as organizational closeness or amount of relevance for a task. Relationships can be familial relationships, friendship relationships, organizational relationships, task relevance relationships, or relationships derived from a social network. For example, Individual X can be the spouse of Person A, the parent of Person B, and the friend of Person C, with correspondingly strong relationship weight values. Relationships can also exist between a first person and a second person where the first person knows the second person but the second person does not know the first person, for example when the second person is a celebrity such as an artist, sports figure, politician, or athlete.

According to embodiments of the present invention, a relationship set is provided for an individual. The relationship set includes a relationship weight value representing the strength of a relationship between the individual and each of a plurality of persons. Relationship weights can express a positive relationship (i.e. a relationship in which the partners like each other) or can express a negative relationship (i.e. a relationship in which the partners dislike each other).

The relationship weight values can be expressed in a variety of ways as will be understood by those knowledgeable in mathematics. In one embodiment, the relationship weight values range from zero to one (or a multiple of one). In another embodiment, positive and negative values are used, for example ranging from −1.0 to 1.0 (or a multiple of −1.0 and 1.0). This latter embodiment is useful for also expressing negative relationships. In one example, referring to FIG. 2, a table illustrates the relationship weight values ranging from zero to one between an individual X and each of five persons A, B, C, D, and E. The strengths are expressed as percents with a maximum value of 100% (or 1.0) and a minimum value of 0% (or 0.0). As can be seen in the table, Individual X has a relationship weight value with Person A of 80%, with Person B of 50%, with Person C of 20%, and no relationships with Person D or Person E (a relationship weight value of 0%).

In another embodiment of the present invention, a relationship weight value can have a time, context, or location dependency. For example, a team mate on a sports team can have a strong relationship weight value in the context of a sporting contest, at a sporting venue, or during a sporting contest, while in other contexts such as a familial context, the relationship weight value can be smaller.

In yet another embodiment, a relationship weight value can include a dependence on the presence of other people or objects in the scene. In this case, the relationship weight value for an individual with respect to Person A is increased if Person B is also present. Alternatively, the relationship weight value for an individual with respect to Person A is decreased if Person B is also present. This dependence can accommodate situations in which the relationship between Persons A and B has an influence on the value of an image to an individual.

Thus, relationship weight values can also depend on the presence of people groups in the scene. To accommodate such an arrangement, a database storing relationship weight values can also include relationship weight factors (for example additional or multiplicative) associated with one or more persons or objects. When these persons or objects are found in an image, the relationship weight values associated with a person can be increased or decreased accordingly. A variety of ways to store such relationship weight factors are known to those skilled in the art, for example by including a unique element in a relationship database entry for each individual in the group, the unique element having a relationship weight factor and a listing of the group members.

Figure 3:
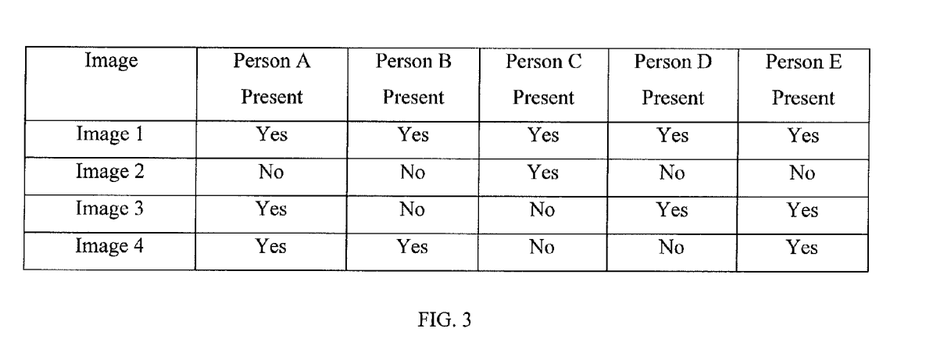
FIG. 3 is a table illustrating persons present in images in an image collection useful in understanding the present invention.

Referring to FIG. 3, a variety of images can include multiple persons and one person can be in one or more images in the image collection. Other persons can be in only one image. Table entries for persons not present in an image are shown with a dash in the tables.

Figure 2:
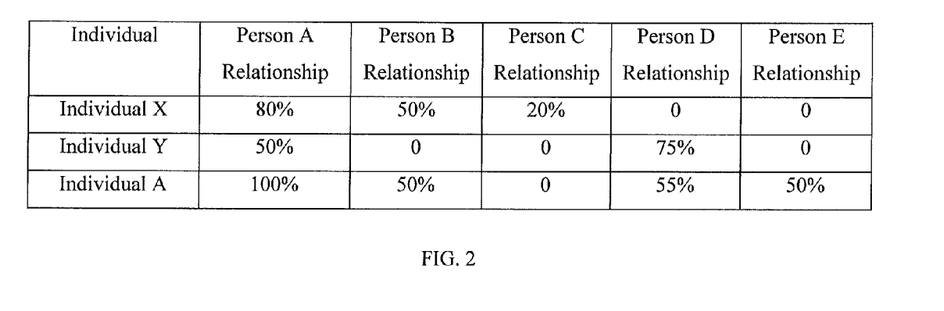
FIG. 2 is a table illustrating relationship weights useful in understanding the present invention.
Figure 4:
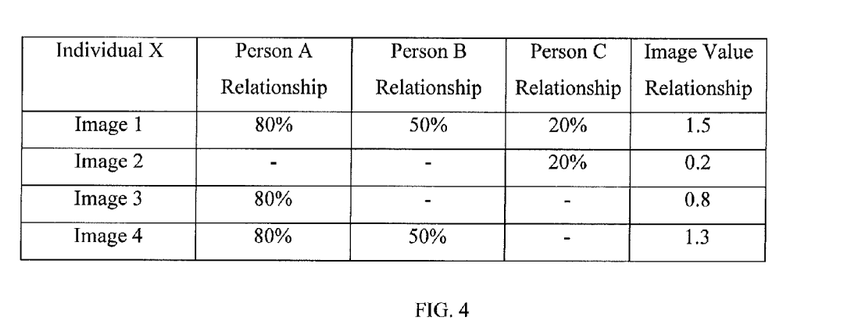
FIG. 4 is a table illustrating relationship weights with respect to an individual for multiple images useful in understanding the present invention.

In an embodiment of the present invention, if an image in the image collection includes multiple persons, the assigned image weight value for the image is a combination of the Individual's relationship weight values with each of the multiple persons. In the example of FIG. 2, if an image in the image collection includes Persons A, B, and C, the assigned image weight value for the image for Individual X is a combination of the Individual X relationship weight values 80%, 50%, and 20% for Persons A, B, and C. In one embodiment of the present invention, the combination is an additive combination so that the assigned image weight value for Individual X is the sum of the relationship weight values of the Persons A, B, and C in the image. In this example as shown in FIG. 4 for Individual X, the assigned image weight value for Image 1 is the sum of 0.80, 0.50, and 0.20, or 1.50. For Image 2, the value is 0.2; for Image 3; the value is 0.8, while for Image 4 the value is 1.3.

An individual can also be a person in an image. For example, Individual A can also be Person A in an image and have a relationship with him or herself. Note that the relationship weight value associated with specific relationships can be different for different people. For example, one individual could value pictures of him or herself (expressed as a 100% relationship weight value for Individual A and Person A in FIG. 2) or could value pictures of others more highly and consequently provide a lower relationship weight value to pictures of him or herself. As shown in FIG. 2, Individual A does not have a relationship with Person C (although his or her spouse Individual X does), but does have a relationship with Persons D and E, as indicated (although his or her spouse Individual X does not).

Different relationship sets can exist for an image for different individuals. Referring again to the example of FIG. 2, relationship weight values are provided for each of Individuals X, Y, and A. Thus, each row of the table is a different relationship set. In another embodiment of the present invention, a relationship between an Individual and a Person can be derived for Individuals that do not have a relationship explicitly indicated in the Individual's relationship set. For example, Individual X has a relationship weight value greater than zero with first Person A but not with second Persons D and E. First Person A, in turn, has a relationship weight greater than zero with second Persons D and E. Thus, an inferred relationship can be derived between Individual X and second Persons D and E through first Person A. The relationships between Persons can also be used to express a degree of emotional closeness in a relationship, degrees of other types of relationships, such as organizational closeness or amount of relevance for a task, or familial relationships, friendship relationships, or relationships derived from a social network.

Thus, in an embodiment of the present invention, the image collection can include images having at least first and second persons in one or more of the images in the collection and a relationship between the individual and the first person and a relationship between the first person and the second person, each relationship having a relationship weight value. A processor can be used to compute a relationship weight value between the individual and the second person. In a further embodiment, the computed relationship weight value is a multiplicative combination of the relationship weight values of the first person and the second person.

Figure 5:
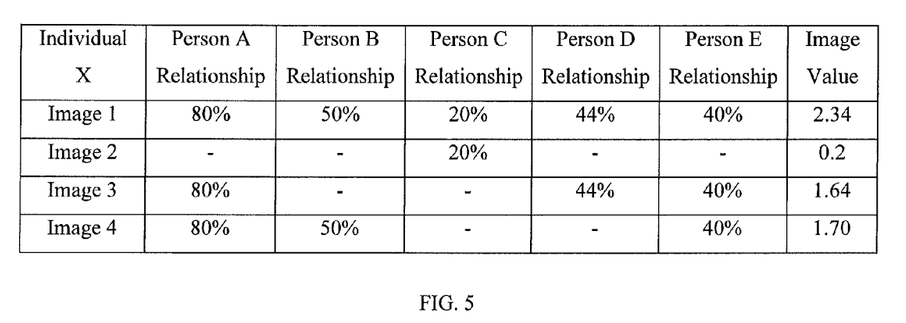
FIG. 5 is a table illustrating relationship weights with inferred relationship weights useful in understanding the present invention.

Referring to FIG. 5 in the example given above for Individual X and Persons A, D, and E, the relationship weight value between Individual X and Person A is 80% and the relationship weight value between Individual A (Person A) and Person D is 55% (FIG. 2) so an inferred relationship weight value between Individual A and Person D is a combination of 80% and 55%. In one embodiment, the computed combination is a multiplicative combination, so that the inferred relationship weight value between Individual X and Person D is the product of 80% and 55% or 44% (0.44). Likewise, the inferred relationship weight value between Individual X and Person E is the product of 80% and 50% or 40% (0.40). In this embodiment, the assigned weight value for the image is then the sum of the relationship weight values for each of the persons in the image, including the inferred values. Thus, for Individual X, Image 1 has an assigned image value of 2.34 (equal to the sum of 0.8, 0.5, 0.2, 0.44, and 0.4). Similarly, Image 2 has an assigned image value of 0.2 (no changes, since Person C is the only person present in the image and has an existing direct relationship with Individual X). Image 3 has an assigned value of 1.64 and Image 4 has an assigned value of 1.70.

In yet another embodiment, an existing non-zero, relationship weight can be adjusted with other derived, inferred weights. For example, the relationship weight for Individual X with Person B (50%) can be adjusted by combining it with a derived relationship weight through Individual A (who also has a relationship with Person B of 50%). The product of the weight relationships between Individual X and Person A (80%) can be combined with the weight relationship between Person A and Person B (50%), yielding 0.40, and added to the relationship weight for Individual X with Person B (50%), resulting in an adjusted relationship weight for Individual X with Person B of 0.90.

Figure 6:
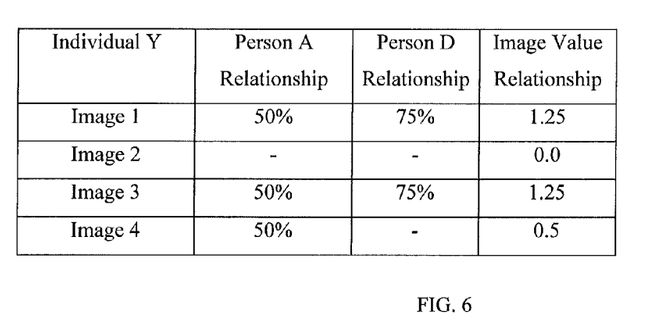
FIG. 6 is another table illustrating relationship weights with respect to another individual for multiple images useful in understanding the present invention.
Figure 7:
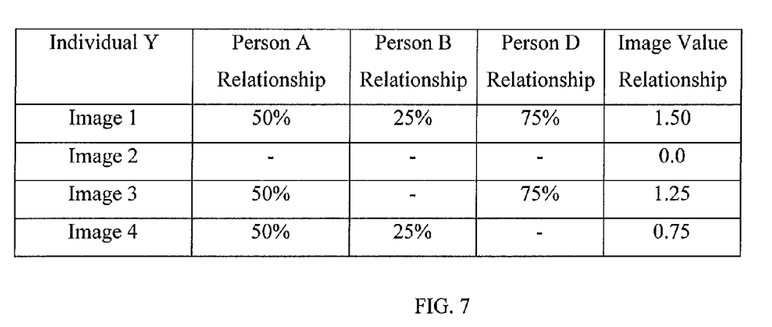
FIG. 7 is another table illustrating relationship weights with inferred relationship weights useful in understanding the present invention.

In a second example, FIG. 2 shows that Individual Y has direct relationships with Persons A and D of 50% and 75%, respectively. Referring to FIG. 3, and as shown in FIG. 6, this corresponds to assigned image values of 1.25 for Image 1, zero for Image 2, 1.25 for Image 3, and 0.5 for Image 4. Individual Y has a relationship with Person A who, in turn, has a relationship with Person B. Hence, if inferred relationships are included, Individual Y can have an inferred relationship with Person B that is the product of 0.50 (Individual Y's relationship weight with Person A) and 0.50 (Individual A's relationship weight with Person A) for a computed value of 0.25. FIG. 7 illustrates the assigned image values including the inferred relationship between Individual Y and Person B.

Figure 11:
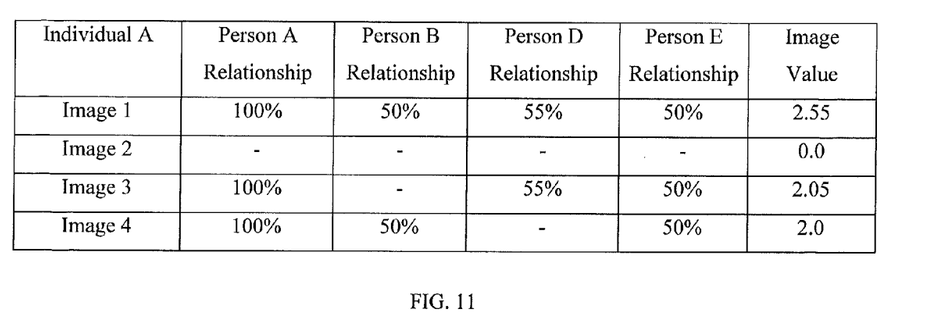
FIG. 11 is another table illustrating relationship weights with an individual who is also present in one or more of the images useful in understanding the present invention.

As noted, an individual can also appear as a person in an image. The relationship set for that individual and image then includes a relationship weight for the individual. As illustrated in FIG. 2 for Person A, the relationship weight is 100% (but can be lower). The assigned image weights for Person A for the images are illustrated in FIG. 11. Since Individual A has no direct relationship with Person C, Person C is excluded from FIG. 11. Relationship weight values are entered for each image for those persons appearing in the corresponding image.

Figure 12:
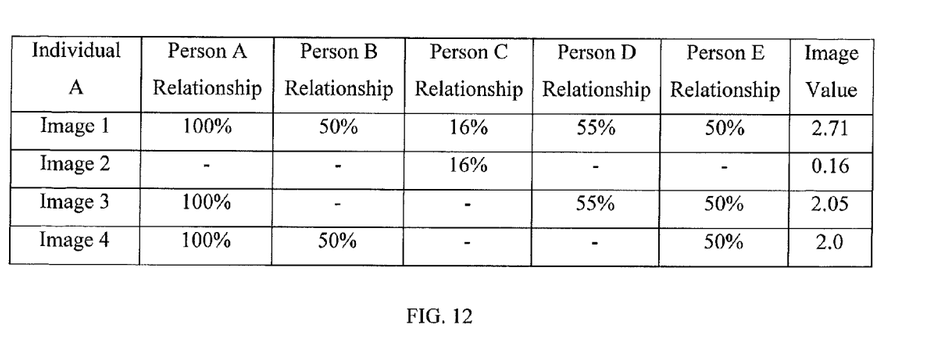
FIG. 12 is another table illustrating relationship weights with inferred relationship weights useful in understanding the present invention.

Since Individual A has a relationship with Individual X, relationships can be inferred between Individual A and those persons that have a relationship with Individual X. Since Individual X has a relationship with Person C and a relationship with Person A, Persons A and C can have an inferred relationship, for example the product of the relationship between Individual X and Person C and the relationship between Individual X and Person A. This product is 80% times 20%, or 0.16. Referring to FIG. 12, both Image 1 and Image 2 include a depiction of Person C. The inferred relationship weight for Individual A for Person C is 16%, which value has been added to the assigned weight for those images.

Figure 13:
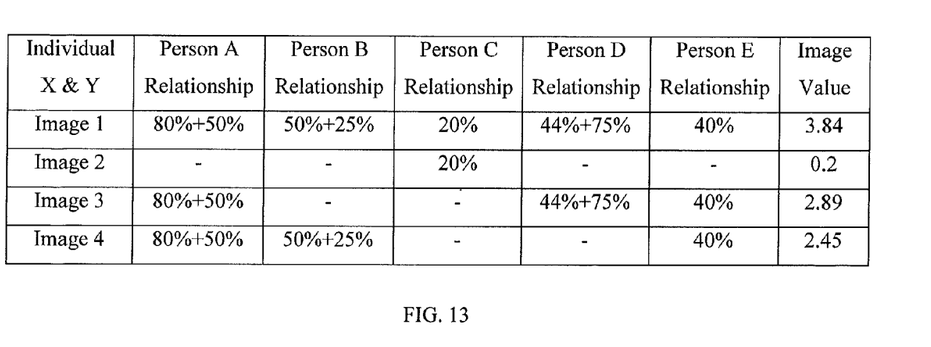
FIG. 13 is a table illustrating the combination of relationship weights for two different individuals useful in understanding the present invention.

A relationship set can be independent of any particular image or image collection and the relationship weight values in a relationship set can be applied to more than one image. In an embodiment, an image can include two or more individuals, all of whom have relationships with one or more of the other persons in the image. In another embodiment, an assigned image value can then include a combination of values from multiple relationship sets, for example an additive combination. Thus, the selected images can be intended to have value to all of the individuals. The relationship sets can also be weighted to provide more value in the selected image set to one individual than to others. Referring to FIG. 13, the assigned image values for the four Images are the sums of the assigned image values for each of Individual X and Individual Y.

In another embodiment, different image weight values can be assigned from the different relationship sets. Thus, two or more different selected-image collections can be made from the same image collection based on the image weight values corresponding to each of the two or more individuals. For example, one or more photographers at a single event can provide an image collection. Different individuals attending the event can prefer different images in the image collection, even though the different individuals can be in some of the same images. For example, FIG. 5 illustrates the assigned image values for Individual X while FIG. 7 illustrates the different assigned image values for Individual Y, even though the images are part of the same image collection.

Figure 14:
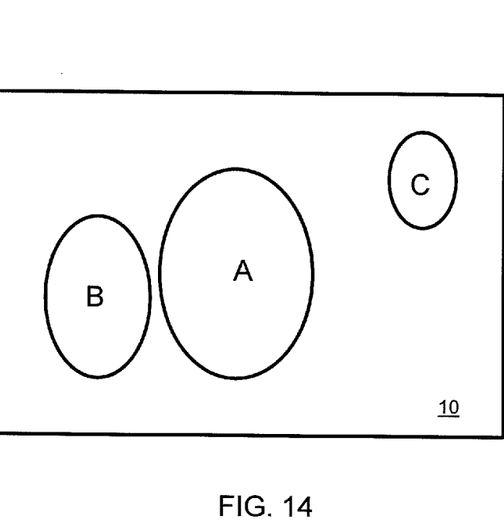
FIG. 14 is a schematic illustrating persons in an image useful in understanding the present invention.

A variety of rules can be applied to assign image weight values. Relationship weight values can be assigned or adjusted depending on a variety of factors. For example, the location, position, or size of one person in an image, or the color or style of dress or appearance can affect the prominence and desirability of the person in the image. A position can include the foreground or background of an image. The prominence can be relative or absolute, for example a person in the image can be larger or smaller relative to another person in the image, relative to an image size, or the person in the image can be a specific size. As shown in FIG. 14, a Person A can be centrally located, in the foreground, and the largest person in image 10, thereby having a larger prominence value, while Person B is slightly smaller, in the foreground, and adjacent to person A in a less central location and can have a somewhat smaller prominence value in image 10. Person C is smaller than Persons A or B and is not located centrally or in the foreground of the image 10, and thus can have prominence value smaller than either Person A or Person B in the image 10.

Figure 15:
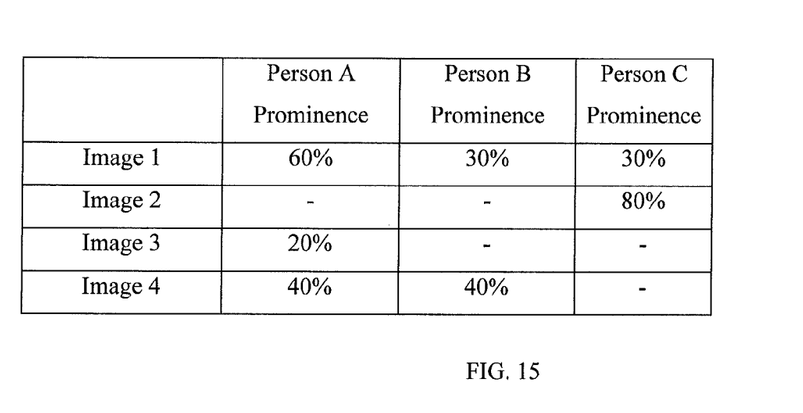
FIG. 15 is a table illustrating prominence values useful in understanding the present invention.

A prominence value can be assigned to a person in an image associated with the prominence of that person and the relationship weight value can be adjusted in view of the prominence value. In various embodiments of the present invention, the prominence value corresponds to the size of the person with respect to the size of the image, the prominence value corresponds to the size of the person with respect to the size of other persons in the image, or the prominence value corresponds to the location, position, or pose of the person in the image. Referring to the example of FIG. 15, the prominence weightings for Persons A, B, and C are given for Images 1, 2, 3, and 4.

In another embodiment in which the individual is in the image, the prominence value for a person in the image is associated with the relative location, position, proximity, or pose of the person with respect to the individual. Thus, the prominence value for a person can be different for different relationship sets associated with different individuals. For example, consider a wedding photograph or family photograph of a celebratory anniversary reunion. In these situations, it is often the case that a couple (e.g. the bride and groom or the anniversary couple) are located adjacent to each other in the center of the photograph and can be arm-in-arm, holding hands, leaning or looking toward each other. Each of these factors or a combination of these factors can be used to influence the prominence value of the persons in the image.

Figure 16:
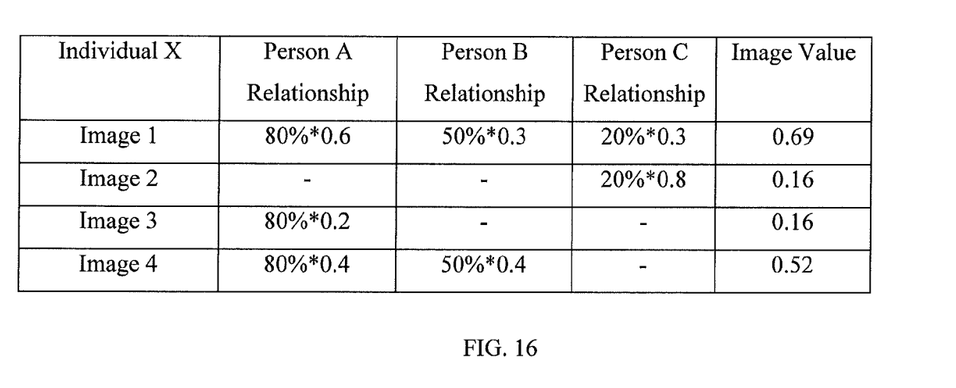
FIG. 16 is a table illustrating the combination of relationship weights and prominence values useful in understanding the present invention.

Referring to FIG. 16, assigned image values can be adjusted to include a combination of the relationship weights for persons in an image and the prominence value of the persons in the image, for a given individual. As shown in FIG. 16, for Individual X, the direct relationship weights for Persons A, B, and C are adjusted with the prominence values for the Persons A, B, and C to provide the assigned image weight values for the image. In this example, the prominence value for a person in an image is multiplied by the relationship weight for the person in the image. The prominence values are given as a value from zero to one. Other ranges or combinations can be used as will be appreciated by those skilled in mathematics.

Figure 17:
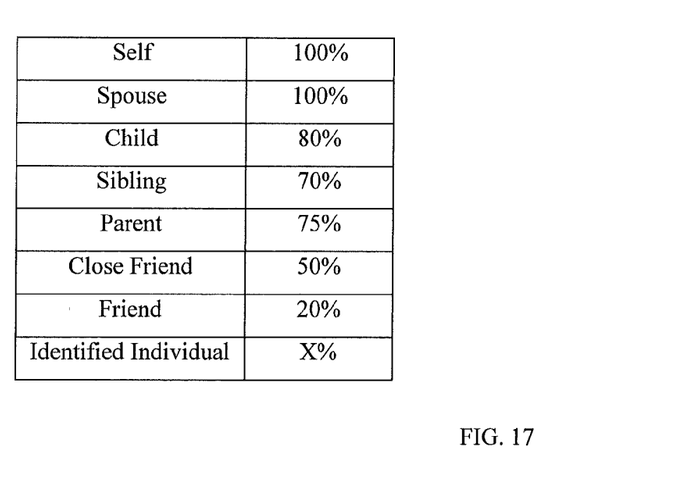
FIG. 17 is a table illustrating relationship weights with associated relationship weights useful in understanding the present invention.

In a further embodiment of the present invention, the relationship set is provided by an individual. In an alternative embodiment, relationship weights associated with known relationship types are provided (for example as shown in FIG. 17) and a relationship is determined between individuals and persons in an image collection by analyzing images in the collection to detect relationships or by accessing information sources such as social network sites to determine relationships. The relationship information is then combined with the generic relationship weights to populate a relationship set for one or more individuals and a group of persons.

Image collections can be received from individuals, persons, users of a service, or derived from a social network. Images can be digital images and can be part of multi-media electronic elements, for example videos with audio.

According to the present invention, an image product, photographic product, or photo-product is a printed or electronic product that includes multiple images incorporated into an image-related object, such as for example a photo-book, photo-album, a photo-card, a picture greeting card, a photo-collage, a picture mug, or other image-bearing product. The images can be a user's personal images and the image product can be personalized. The images can be located in specified pre-determined locations or can be adaptively located according to the sizes, aspect ratios, orientations and other attributes of the images. Likewise, the image sizes, orientations, or aspect ratios included in the image product can be adjusted, either to accommodate pre-defined templates with specific pre-determined openings or adaptively adjusted for inclusion in an image-bearing product.

As intended herein, an image product can include printed images, for example images printed on photographic paper, cardboard, writing paper, textiles, ceramics, rubber such as foam rubber, and polymers. These printed images can be assembled or bound into image products. In an alternative embodiment, the image product can be an electronic image product suitable for display on an electronic display by a computing device and stored as a file, or multiple files, in an electronic storage system such as a computer-controlled disk drive or solid-state memory. Such image products can include, for example, photobooks, collages, or slide shows that include one or more images with or without ancillary images such as templates, backgrounds, clip art and the like. In various embodiments, an image product includes multiple still images or video images and can include other sensory modalities such as sound. The electronic image products are displayed by a computer on a display, for example as a single image. Alternatively, electronic image products are shown on a computer-controlled display by sequentially displaying multiple pages in the image product together with outputting any other related image product information such as sound. Such display can be interactively controlled by a user. Such display devices and image products are known in the art as are user interfaces for controlling the viewing of image products on a display. An image product that includes the selected images in the selected collection can be made or delivered to the individual, persons, or users of a service.

Various embodiments of the present invention can be implemented using a variety of computers and computer systems illustrated in FIGS. 8, 9 and 10 and discussed further below. In one preferred embodiment, for example, a desktop or laptop computer executing a software application can provide a multi-media display apparatus suitable for analyzing images, computing image weight values from relationship weights of persons found in an image, and selecting images to make a selected-image collection. In a preferred embodiment, a multi-media display apparatus includes: a display having a graphic user interface (GUI) including a user-interactive GUI pointing device; a plurality of multi-media elements displayed on the GUI, and user interface devices for providing a way to a user for entering information into the system. A desktop computer, for example, can provide such an apparatus.

In another preferred embodiment, a computer server can provide web pages that are served over a network to a remote client computer. The web pages can permit a user of the remote client computer to provide digital images or relationship sets. Applications provided by the web server to a remote client can select digital images using the relationship sets, either as stand-alone software tools or provided through html, Java, or other known-internet interactive tools. In this embodiment, a multi-media display system includes: a server computer providing graphical user interface display elements and functions to a remote client computer connected to the server computer through a computer network such as the internet, the remote client computer including a display having a graphic user interface (GUI) including a user-interactive GUI pointing device; and a plurality of multi-media elements stored on the server computer, communicated to the remote client computer, and displayed on the GUI.

Computers and computer systems are stored program machines that execute software programs to implement desired functions. According to a preferred embodiment of the present invention, a software program executing on a computer with a display and graphic user interface (GUI) including a user-interactive GUI pointing device includes software for displaying a plurality of multi-media elements having images on the GUI and for performing the steps of the various methods described above.

Face recognition and identification can be performed manually on an image, for example by a user, and the information stored. Alternatively, image analysis algorithms implemented in software executing on a stored-program machine useful for the present invention are known in the art. Face recognition and identification can be done automatically. Using computer methods described in the article "Rapid object detection using a boosted cascade of simple features," by P. Viola and M. Jones, in *Computer Vision and Pattern Recognition*, 2001, *Proceedings of the* 2001 *IEEE Computer Society Conference*, 2001, pp. I-511-I-518 vol 1; or in "Feature-centric evaluation for efficient cascaded object detection," by H. Schneiderman, in *Computer Vision and Pattern Recognition*, 2004; *Proceedings of the* 2004 *IEEE Computer Society Conference*, 2004, pp. II-29-II-36, Vol. 2., the size and location of each face can be found within each digital image and is useful in determining close-up types of images and images containing people. These two documents are incorporated by reference herein in their entirety. Viola uses a training set of positive face and negative non-face images. The face classification can work using a specified window size. This window is slid across and down all pixels in the image in order to detect faces. The window is enlarged so as to detect larger faces in the image. The process repeats until all faces of all sizes are found in the image. Not only will this process find all faces in the image, it will return the location and size of each face.

Active shape models as described in "Active shape models—their training and application," by Cootes, T. F. Cootes, C. J. Taylor, D. H. Cooper, and J. Graham, *Computer Vision and Image Understanding*, vol. 61, pp. 38-59, 1995, can be used to localize all facial features such as eyes, nose, lips, face outline, and eyebrows. These documents are incorporated by reference herein in their entirety. Using the features that are thus found, one can then determine if eyes/mouth are open, or if the expression is happy, sad, scared, serious, neutral, or if the person has a pleasing smile. Determining pose uses similar extracted features, as described in "*Facial Pose Estimation Using a Symmetrical Feature Model*" by R. W. Ptucha, A. Savakis, *Proceedings of ICME—Workshop on Media Information Analysis for Personal and Social Applications*, 2009, which develops a geometric model that adheres to anthropometric constraints. With pose and expression information stored for each face, embodiments of the present invention can be programmed to classify digital images according to these various detected types (happy, sad, scared, serious, and neutral).

A main subject detection algorithm, such as the one described in U.S. Pat. No. 6,282,317, involves segmenting a digital image into a few regions of homogeneous properties such as color and texture. Region segments can be grouped into larger regions based on such similarity measures. Regions are algorithmically evaluated for their saliency using two independent yet complementary types of saliency features—structural saliency features and semantic saliency features. The structural saliency features are determined by measureable characteristics such as location, size, shape and symmetry of each region in an image. The semantic saliency features are based upon previous knowledge of known objects/regions in an image which are likely to be part of foreground (for example, statues, buildings, people) or background (for example, sky, and grass), using color, brightness, and texture measurements. For example, identifying key features such as flesh, face, sky, grass, and other green vegetation by algorithmic processing are well characterized in the literature.

Figure 8:
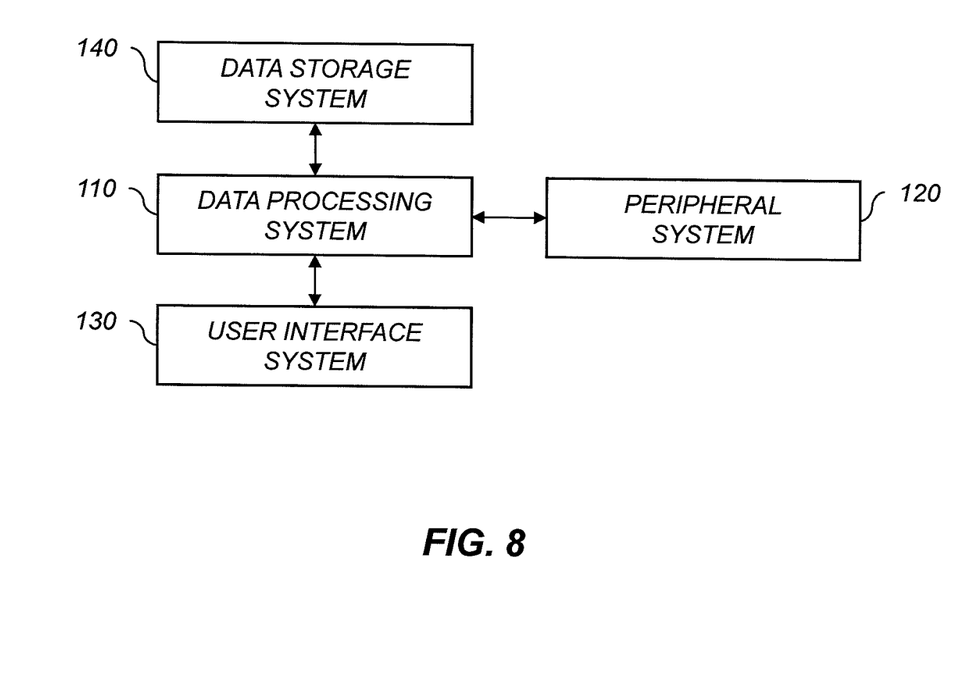
FIG. 8 is a schematic illustrating a system useful for performing a method of the present invention.

FIG. 8 is a high-level diagram showing the components of a system useful for various preferred embodiments of the present invention. The system includes a data processing system 110, a peripheral system 120, a user interface system 130, and a data storage system 140. The peripheral system 120, the user interface system 130 and the data storage system 140 are communicatively connected to the data processing system 110. The system can be interconnected to other data processing or storage system through a network, for example the internet.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, a smart phone or any other device for processing data, managing data, communicating data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, smart phones, or other data processors. The data processing system 110, upon receipt of digital content records from a device in the peripheral system 120, can store such digital content records in the data storage system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 8.

Figure 9:
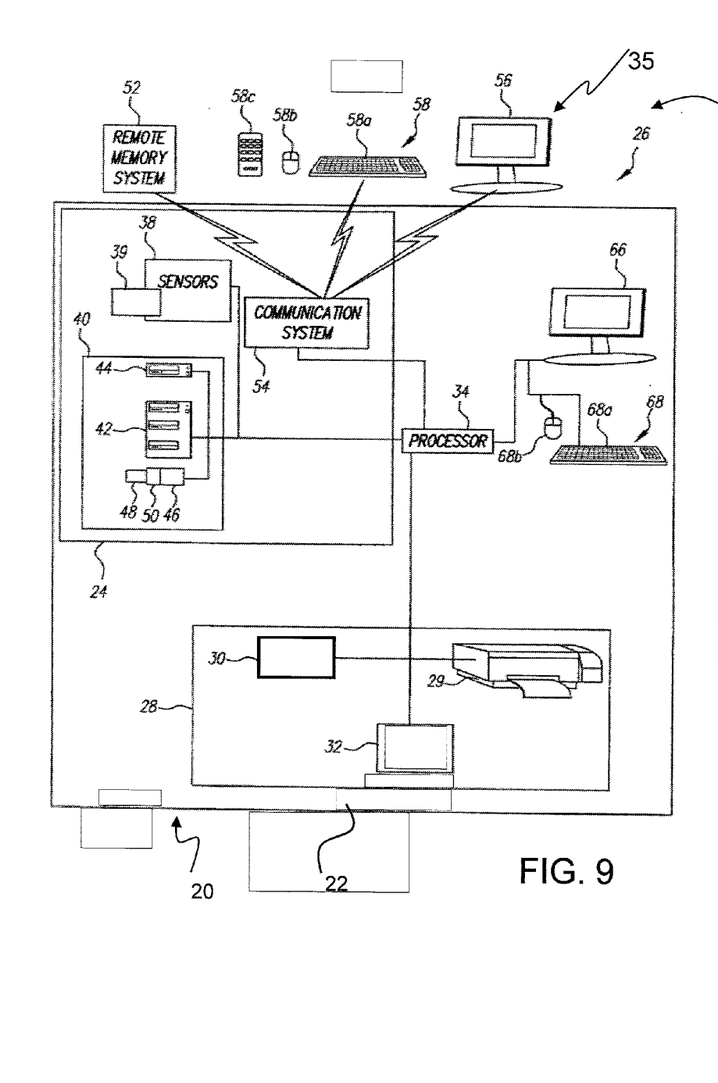
FIG. 9 is a schematic illustrating another system useful for performing a method of the present invention.
Figure 10:
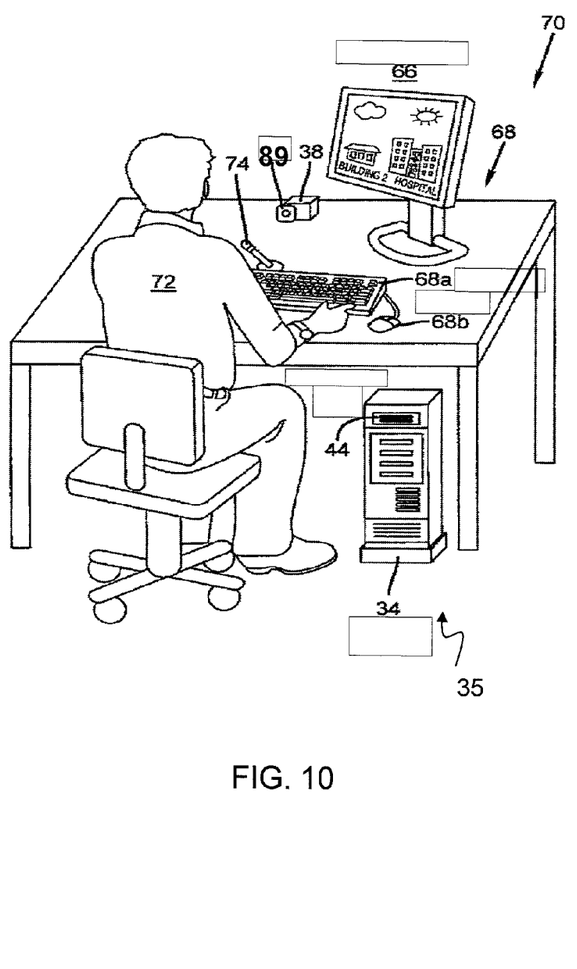
FIG. 10 is a schematic illustrating another system useful for performing a method of the present invention.

Referring to FIGS. 9 and 10, computers, computer servers, and a communication system are illustrated together with various elements and components that are useful in accordance with various preferred embodiments of the present invention. FIG. 9 illustrates a preferred embodiment of an electronic system 20 that can be used in generating an image product. In the preferred embodiment of FIG. 9, electronic system 20 includes a housing 22 and a source of content data files 24, a user input system 26 and an output system 28 connected to a processor 34. The source of content data files 24, user-input system 26 or output system 28 and processor 34 can be located within housing 22 as illustrated. In other preferred embodiments, circuits and systems of the source of content data files 24, user input system 26 or output system 28 can be located in whole or in part outside of housing 22.

The source of content data files 24 can include any form of electronic or other circuit or system that can supply digital data to processor 34 from which processor 34 can derive images for use in forming an image-enhanced item. In this regard, the content data files 24 can include, for example and without limitation, still images, image sequences, video graphics, and computer-generated images. Source of content data files 24 can optionally capture images to create content data for use in content data files 24 by use of capture devices located at, or connected to, electronic system 20 or can obtain content data files 24 that have been prepared by or using other devices. In the preferred embodiment of FIG. 9, source of content data files 24 includes sensors 38 such as a digital camera 89, a memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within system 20 or it can be removable. In the preferred embodiment of FIG. 9, system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the preferred embodiment shown in FIG. 9, system 20 has a communication system 54 that in this preferred embodiment can be used to communicate with an optional remote memory system 52, an optional remote display 56, or an optional remote input 58. The optional remote memory system 52, optional remote display 56, an optional remote input 58A can all be part of a remote system 21 having an input station 58 having remote input controls 58 (also referred to herein as "remote input 58"), can include a remote display 56, and that can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can include for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful preferred embodiment, the system 20 can provide web access services to remotely connected computer systems (e.g. remote systems 35) that access the system 20 through a web browser. Alternatively, remote system 35 can provide web services to system 20 depending on the configurations of the systems.

User input system 26 provides a way for a user of system 20 to provide instructions to processor 34. This permits such a user to make a designation of content data files 24 to be used in generating an image-enhanced output product and to select an output form for the output product. User input system 26 can also be used for a variety of other purposes including, but not limited to, permitting a user to arrange, organize and edit content data files 24 to be incorporated into the image-enhanced output product, to provide information about the user or audience, to provide annotation data such as voice and text data, to identify characters in the content data files, and to perform such other interactions with system 20 as will be described later.

In this regard user input system 26 can include any form of transducer or other device capable of receiving an input from a user and converting this input into a form that can be used by processor 34. For example, user input system 26 can include a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the preferred embodiment shown in FIG. 9, user input system 26 includes an optional remote input 58 including a remote keyboard 58a, a remote mouse 58b, and a remote control 58c and a local input 68 including a local keyboard 68a and a local mouse 68b.

Remote input 58 can take a variety of forms, including, but not limited to, the remote keyboard 58a, remote mouse 58b or remote control handheld device 58c illustrated in FIG. 9. Similarly, local input 68 can take a variety of forms. In the preferred embodiment of FIG. 9, local display 66 and local user input 68 are shown directly connected to processor 34.

As is illustrated in FIG. 10, local user input 68 can take the form of a home computer, an editing studio, or kiosk 70 (hereafter also referred to as an "editing area 70") that can also be a remote system 35 or system 20. In this illustration, a user 72 is seated before a console including local keyboard 68a and mouse 68b and a local display 66 which is capable, for example, of displaying multimedia content. As is also illustrated in FIG. 10, editing area 70 can also have sensors 38 including, but not limited to, video sensors 39, audio sensors 74 and other sensors such as multispectral sensors that can monitor user 72 during a production session.

Output system 28 is used for rendering images, text or other graphical representations in a manner that permits image-product designs to be combines with user items and converted into an image product. In this regard, output system 28 can include any conventional structure or system that is known for printing or recording images on output device 32 including, but not limited to, printer 29. Printer 29 can record images on a tangible surface 30 using a variety of known technologies including, but not limited to, conventional four-color offset separation printing or other contact printing, silk screening, dry electro-photography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale, or sepia toned images. As will be readily understood by those skilled in the art, a system 35, 20 with which a user interacts to define a user-personalized image product can be separated from a remote system (e.g. 35, 20) connected to a printer, so that the specification of the image product is remote from its production.

In certain preferred embodiments, the source of content data files 24, user input system 26 and output system 28 can share components.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components. The system 20 of FIGS. 9 and 10 can be employed to make and display an image product according to a preferred embodiment of the present invention.

The invention has been described in detail with particular reference to certain preferred embodiments thereof, but it will be understood that variations and modifications can be effected within the spirit and scope of the invention.

PARTS LIST

A person, individual
B person
C person
D person
E person
X individual
Y individual
10 image
20 system
21 remote system
22 housing
24 source of content data files
26 user input system
28 output system
29 printer
30 tangible surface
32 output device
34 processor
35 remote system
38 sensors
39 video sensors
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
66 local display
68 local input
68a local keyboard
68b local mouse
70 editing area (home computer, editing studio, or kiosk)
72 user
74 audio sensors
89 digital camera
110 data processing system
120 peripheral system
130 user interface system
140 data storage system
200 provide relationship set step
205 provide image collection step
206 detect persons in image step
207 identify detected persons step
210 select weight values for identified persons step
212 calculate image-weight value step
215 assign image-weight value to image step
220 select images based on image-weight value step

The invention claimed is:

1. A method of making a selected-image collection, comprising:
   (a) providing a set of relationships between an individual and a plurality of different persons, each relationship in the relationship set having a pre-determined relationship weight value;
   (b) providing a collection of images, the image collection including images having at least two persons of the plurality of different persons present in the images;
   (c) using a processor to select from the relationship set a relationship weight value corresponding to each person present in each image in the image collection;
   (d) assigning an image weight value to each image in the image collection, the image weight value corresponding to a sum of the selected relationship weight values; and
   (e) selecting images from the image collection based on the image weight values to make the selected-image collection.

2. The method of claim 1 wherein the relationship weight value indicates a degree of closeness of the relationship or a degree of closeness of a type of the relationship.

3. The method of claim 1 wherein the relationships are familial relationships, friendship relationships, organizational relationships, task relevance relationships, celebrity relationships, or relationships derived from a social network.

4. The method of claim 1 wherein the image collection includes images having at least first and second persons in one or more of the images in the collection and a relationship between the individual and the first person and a relationship between the first person and the second person, each relationship having a relationship weight value, and using a processor to compute a relationship weight value between the individual and the second person.

5. The method of claim 4 wherein the relationship between the first and second persons is a familial relationship, friendship relationship, or a relationship derived from a social network.

6. The method of claim 4 wherein the computed relationship weight value is a multiplicative combination of the relationship weight values of the first person and the second person.

7. The method of claim 1 wherein the relationship weight values range from zero to one or range from minus one to positive one, or a multiple of the range.

8. The method of claim 1 wherein the assigned image weight values are based on rules.

9. The method of claim 1 wherein the individual is in the image and the individual has a relationship weight value.

10. The method of claim 1 further including providing a prominence value associated with the prominence of the at least one person and adjusting the relationship weight value in view of the prominence value.

11. The method of claim 10 wherein the prominence value corresponds to the size of the at least one person with respect to the size of the image, wherein the prominence value corresponds to the size of the at least one person with respect to the size of other persons in the image, or wherein the prominence value corresponds to the location, position, or pose of the at least one person in the image.

12. The method of claim 10 wherein the individual is in the image and wherein the prominence value corresponds to the location, position, proximity, or pose of the at least one person with respect to the individual.

13. The method of claim 1 wherein at least some of the images include two or more different individuals having different relationship sets.

14. The method of claim 13 wherein at least some of the image weight values for each of the two or more individuals are different and further including making two or more different selected-image collections from the same image collection based on the image weight values corresponding to each of the two or more individuals.

15. The method of claim 13 further including assigning an image weight value that includes a combination of relationship weight values from each of two or more relationship sets.

16. The method of claim 1 further including using a processor to analyze the images and detect the relationship between the individual and a person.

17. The method of claim 1 further including accessing a social network to determine the relationship between the individual and a person.

18. The method of claim 1 further including receiving the image collection or deriving the image collection from a social network.

19. The method of claim 1 further including providing a set of relationships between each of two or more individuals and each of a plurality of different persons, each relationship in the relationship sets having a pre-determined relationship weight value, and assigning an image weight value to each image in the image collection, the image weight value corresponding to a combination of the relationship weight values for each of the two or more individuals.

20. The method of claim 19 wherein the combination is additive.

21. The method of claim 19 wherein the relationship weight values for one of the two or more individuals is weighted differently from the relationship weight values for another of the two or more individuals.

22. The method of claim 1 wherein the relationship weight value has a time, context, or location dependency.

23. The method of claim 1 wherein the relationship weight value has a dependence on the presence of other persons or objects in the scene.

* * * * *